W. H. MINER.
FRICTION DRAFT GEAR FOR RAILWAY CAR DRAFT RIGGING.
APPLICATION FILED AUG. 19, 1916.
1,250,616. Patented Dec. 18, 1917.
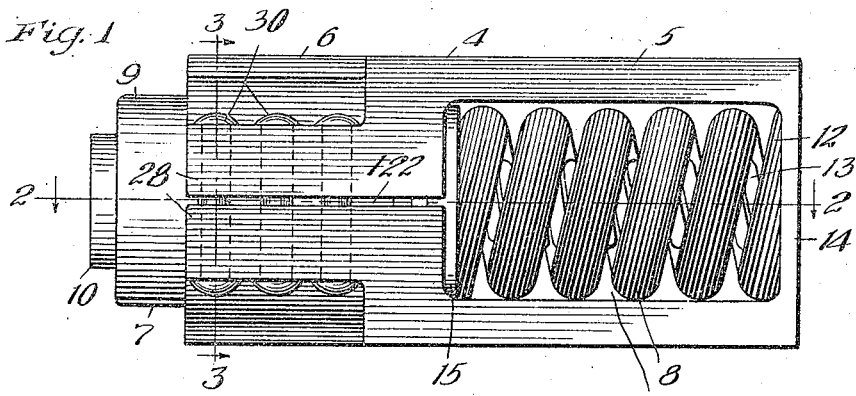
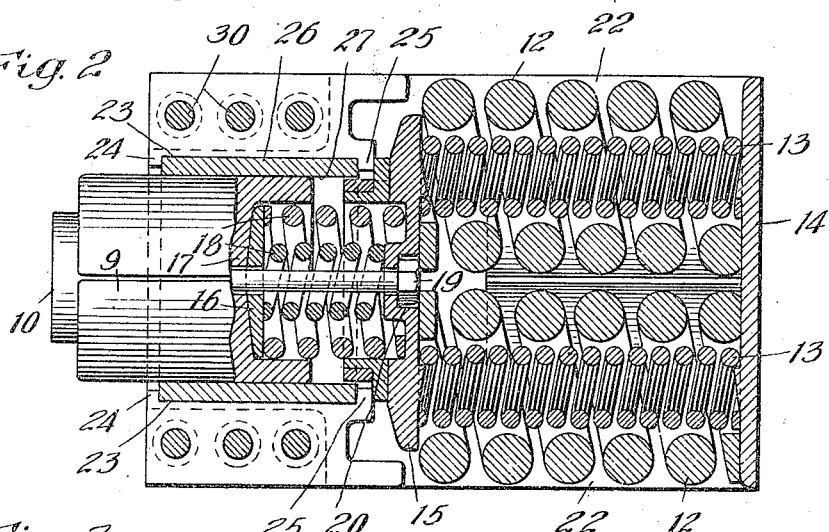
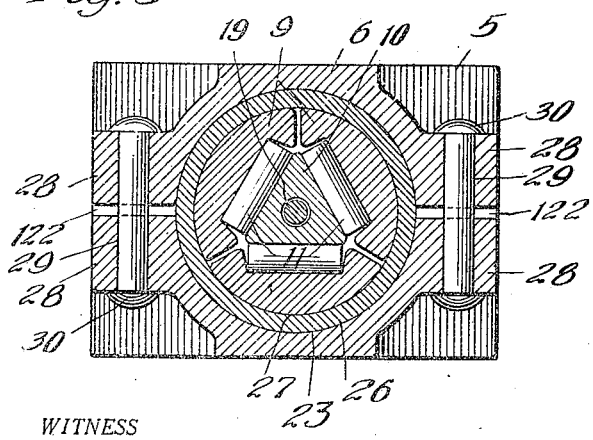
WITNESS
Wm. Geiger
INVENTOR.
William H. Miner
BY George T. Haight
ATTORNEY

UNITED STATES PATENT OFFICE.

WILLIAM H. MINER, OF CHAZY, NEW YORK.

FRICTION DRAFT-GEAR FOR RAILWAY-CAR DRAFT-RIGGING.

1,250,616. Specification of Letters Patent. Patented Dec. 18, 1917.

Application filed August 19, 1916. Serial No. 115,873.

*To all whom it may concern:*

Be it known that I, WILLIAM H. MINER, a citizen of the United States, residing at Chazy, in the county of Clinton and State of New York, have invented a certain new and useful Improvement in Friction Draft-Gears for Railway-Car Draft-Rigging, of which the following is a full, clear, concise, and exact description, reference being had to the accompanying drawings, forming a part of this specification.

My invention relates to improvements in friction draft gears for railway car draft rigging.

The object of my invention is to provide an efficient and durable friction draft gear.

In the drawings forming a part of this specification, Figure 1 is a side elevation of a draft gear embodying my invention. Fig. 2 is a horizontal section on line 2—2 of Fig. 1 and Fig. 3 is a cross section on line 3—3 of Fig. 1.

Referring to the drawings, the numeral 4 indicates a draft gear shell comprising a spring cage 5 and a preferably integral friction casing 6. Friction elements 7 are mounted within the friction casing and spring elements 8 are mounted within the spring cage. The friction elements 7 comprise the friction shoes 9—9, a spreading member or wedge 10 and the interposed anti-friction rollers 11—11. The spring elements 8 in the embodiment of my invention shown in the drawings comprise the main springs 12—12, arranged side by side within the spring cage 5, each main spring having an inner coil 13 nested therein. The said springs are seated at their rear ends against the rear end of the spring cage 14 and at their forward ends against the movable spring seat or internal follower 15. A washer 16 is seated against the shoulders 17 provided near the rear ends of the friction shoes and a two coil auxiliary spring 18 is mounted between the movable spring seat 15 and the washer 16. A connecting bolt 19 extends from the movable follower 15 to the wedge 10 and has a countersunk head 20 at its rear end and is received within the wedge 10 at its forward end. The shell at the spring cage portion thereof is open at the sides, as indicated at the numerals 22, and forwardly of said openings and along the friction casing portion of the shell the said shell is split on either side, as indicated at the numerals 122, forming the friction casing into an upper and a lower section. The friction casing is internally provided with an annular groove 23 formed between the inturned forward shoulder 24 and the inturned rearward shoulder 25. Within this annular groove is mounted the liner 26, the inner face 27 of which forms a friction face against which the friction shoes are adapted to engage. The shell along the friction casing portion thereof is provided on either side with the upper and lower lateral extensions 28—28, respectively, the said extensions being provided with a plurality of vertical registering perforations 29 to receive riveting means, as for instance the rivets 30—30.

In assembling the parts of the draft gear, a shell is provided with the upper and lower portions sufficiently separated at the forward end to permit the passage into the annular groove of the liner 26. When the liner is placed in position, the two portions of the shell are drawn together until the liner is tightly secured within the annular groove and the upper and lower portions of the shell are then securely fastened together by the riveting means, as for instance the rivets 30. Thereupon, the friction and spring elements are assembled within the shell. Should a liner become worn, or if its replacement from this or any other cause should be desirable, it is necessary only to remove the compression resisting elements within the shell, cut, or otherwise remove the riveting means, and thereupon remove the liner and replace it with a like liner.

I claim:—

1. As an article of manufacture, a friction shell for friction draft gears and the like, said shell comprising a plurality of separable members, a liner confined between said members, and means for rigidly securing said members of the shell together, the members of the shell and said liner having coöperating means to prevent relative longitudinal movement of the liner with respect to the shell when the members of the latter are rigidly secured together.

2. As an article of manufacture, a combined friction shell and spring casing, said shell and spring casing having a cylindrical portion at one end and an integral substantially rectangular spring casing at the other end, the spring casing being open at its sides and the shell portion being formed of separable sections, said shell portion being split to thereby permit the spreading apart thereof, a liner mounted within the shell, said shell and liner having coöperating engaging shoulders, and means for tightly and rigidly holding the sections of the shell around the liner.

In witness that I claim the foregoing I have hereunto subscribed my name this 16th day of Aug., 1916.

WILLIAM H. MINER.